E. G. THOMAS.
PRICE CALCULATING WEIGHING SCALE.
APPLICATION FILED FEB. 15, 1917.
1,369,145.
Patented Feb. 22, 1921.
2 SHEETS—SHEET 1.
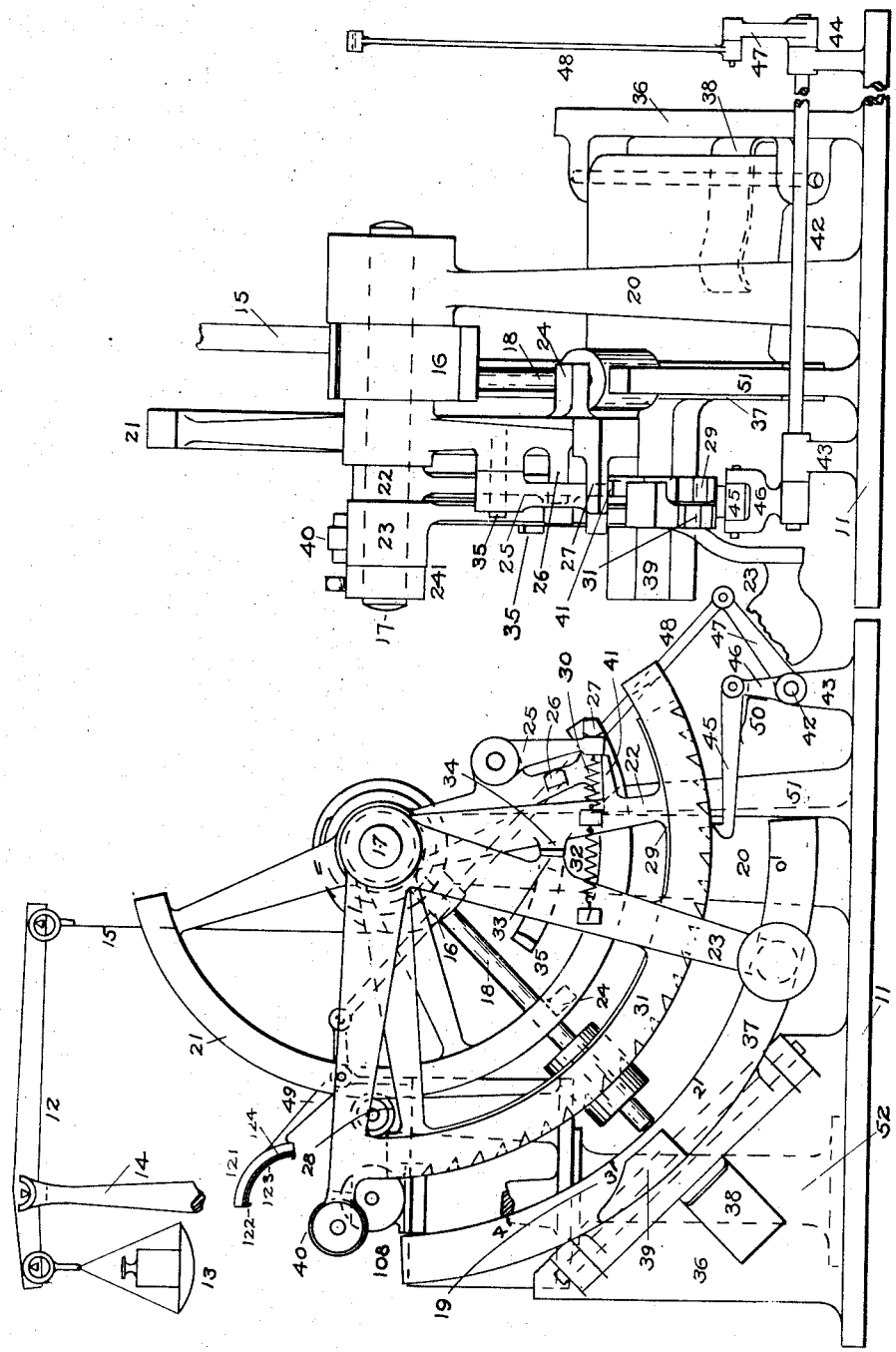
WITNESSES
INVENTOR
Edward G. Thomas E. G. THOMAS.
PRICE CALCULATING WEIGHING SCALE.
APPLICATION FILED FEB. 15, 1917.
1,369,145.
Patented Feb. 22, 1921.
2 SHEETS—SHEET 2.
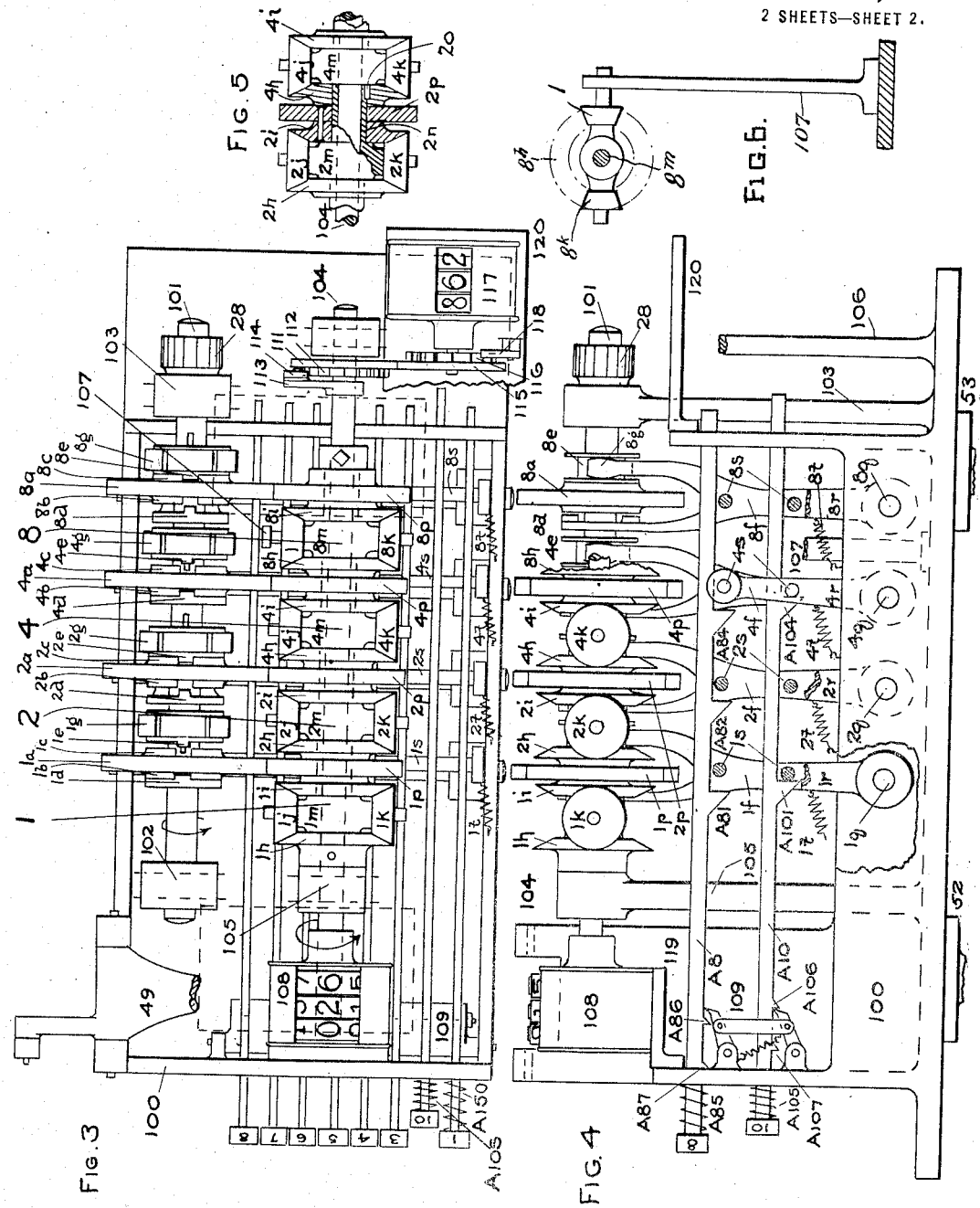
WITNESSES
INVENTOR
Edward G. Thomas

UNITED STATES PATENT OFFICE.

EDWARD G. THOMAS, OF SPRINGFIELD, ILLINOIS, ASSIGNOR TO TOLEDO SCALE COMPANY, OF TOLEDO, OHIO, A CORPORATION OF NEW JERSEY.

PRICE-CALCULATING WEIGHING-SCALE.

1,369,145.

Specification of Letters Patent. Patented Feb. 22, 1921.

Application filed February 15, 1917. Serial No. 148,919.

*To all whom it may concern:*

Be it known that I, EDWARD G. THOMAS, of Springfield, county of Sangamon, State of Illinois, have invented and produced certain new and useful Improvements in Price-Calculating Weighing-Scales, of which the following is a specification, reference being had to the accompanying drawings, which form a part thereof.

This invention relates to improvements in value-calculating and registering weighing scales, and has for its object the construction of a scale and associated mechanism which when operated will indicate and record the money value, at a selected unit rate, of an article weighed upon the scale. In the embodiment of my invention illustrated and described in the following specification there is provided a weighing scale of a usual form in which a swinging pendulum is used to balance the weight of the article being weighed, a device for locking the scale against further movement at end of the weighing operation, calculating mechanism controlled as to its movement by rate setting devices and by the extent of movement of the weighing scale and adapted to be operated by a source of power outside the apparatus, such as the force of the hand applied to a handle, and means for printing the record of the calculating mechanism upon a card or other recording surface at the completion of the calculation. There also is provided a means for totalizing the results of a series of computations.

All operations of the apparatus except that of weighing result from the motion of the operating handle, which also resets the calculating mechanism to the zero position during the reverse movement of the handle to its starting position.

In the drawings which accompany and form a part of this specification, Figure 1 is a side elevation of the weighing scale operating devices, fragmentary portions of the calculating mechanism, and the printing apparatus. Fig. 2 is a rear elevation of the weighing scale and operating devices. Fig. 3 is a top view and Fig. 4 a front elevation of the calculating, indicating and totalizing mechanism. Fig. 5 illustrates details of a differential gearing used in the calculating mechanism. Fig. 6 is a detail view of a part of the calculating mechanism.

Referring to the drawings 11 is a base on which are mounted the various posts, pedestals and brackets in which the various parts of the apparatus are mounted, or by which they are supported. A weighing scale consisting of a beam 12 and scale pan 13 is supported by a post 14 upon knife edges in the usual manner. From the end of beam 12 opposite the scale pan a flexible tape 15 runs to a cam-shaped hub 16, pivotally mounted upon a stud 17. Secured to hub 16 is a pendulum 18 and the beam, cam-shaped hub and pendulum are so designed that equal angular movements of pendulum 18 will be caused by equal increments of weight in scale pan 13. By means of a suitable scale of figures, 19, appropriately located, the weight of the article in the scale pan may be read directly.

Stud 17 is mounted in post 20 and pivoted upon it in order are the cam-shaped hub 16, gear-sector 21, printing ratchet 22 and operating handle 23, all retained in place by a collar 241.

Gear-sector 21 has a projection 24 extending into the path of pendulum 18 to be engaged thereby. It also carries a pivoted arm 25, having a motion limited by stops 26 and 27. This gear-sector 21 meshes with a pinion 28 on the operating shaft of the calculating mechanism and by its motion operates it. Considering forward motion to be that which causes the computation to occur, the rearward motion of the gear-sector 21, is limited by a post 51 attached to base 1.

The printing ratchet 22, which comprises a rim 29, on which teeth are cut only at intervals, leaving between them sections of the circular periphery unbroken, is connected to arm 25 by a tension spring 30, a stop 41 serving to space them apart.

To the operating handle 23, is secured a toothed arc 31 similar to and of the same radius as the rim of the printing ratchet 22. A tension spring 32 connects the handle 23 and ratchet 22 and there is a stop 33 on the operating handle 23 and a stop 34 on the printing ratchet 22, so related that when in contact under the normal action of spring 32, the teeth in the arc 31 upon handle 23 will not register with the teeth on rim 29 of the printing ratchet, but will instead occur opposite the blank spaces in rim 29. A stop 35 is so located as to engage the handle 23 after an extension of spring 32 and consequent relative motion of 22 and 23 sufficient to bring the teeth in the arc 31 and in rim 29 into alinement.

The force necessary to operate the computing mechanism is transmitted from the operating handle through springs 32 and 30. These springs are of such strength and are under such tension, that no further extension will occur during the motion of the apparatus until the gear sector 21 is stopped by engagement of its projection 24 with pendulum 18. Relative motion between gear sector 21 and printing ratchet 22, and ratchet 22 and handle 23 may then occur through the extension of springs 30 and 32 by the application of further force to the handle. The relative strength of springs 30 and 32 is such that handle 23 may be moved into engagement with stop 35 before any extension of spring 30 will occur.

Pivotally mounted on a bracket 36 attached to base 11 is an arc 37 which is arranged to register with and engage pendulum 18, toward which it is strongly pressed by a spring 38. Projecting outward from arc 37 is a finger 39 and upon handle 23 is a roller 40, which will engage finger 39 and force it and arc 37 out of engagement with pendulum 18 when the handle 23 is returned to the zero position of the apparatus, which occurs when projection 24 by a rearward motion is brought into contact with stop 51.

In this position therefore, the weighing scale is entirely free from restraint and will accurately weigh any object placed in its scale pan.

A shaft 42 is pivoted in posts 43 and 44 secured to base 11. A hook 45 is pivoted to an arm 46 secured to the shaft 42 and is pressed upward against the toothed surfaces of rim 29 and arc 31 by a spring 50. To an arm 47 also secured to shaft 42 is pivoted a link 48. This link is pivoted to one arm of a bell crank lever 49, pivoted to the frame of the computing mechanism and carrying a card or other recording surface arranged to register with and receive an imprint from the counter of the computing mechanism to be later described. The end of hook 45 is so wide as to extend over both rim 29 of the printing ratchet 22 and the arc 31 upon the handle 23, so that the point of the hook will not be able to drop into engagement with the teeth of either ratchet or handle unless the teeth of both are in alinement.

Since the computing mechanism of my invention is essentially a means for measuring the motion of gear sector 21 between its zero position and its position when projection 24 engages pendulum 18, I will describe the operation of the parts of my device which have thus far been described.

We will assume that the operating handle has been returned to its zero or starting position by forcing it to the right in Fig. 1 as far as possible. Stops 33 and 34 will be in contact and stop 41 will touch arm 25, which will be pushed back against stop 27. The gear sector will therefore be pushed backward against post 51. The scale is leveled and adjusted so that pendulum 18 just comes into contact with projection 24 when there is no load in the scale pan. When the parts are in this position, arc 37 will be engaged and pushed back out of engagement with pendulum 18 by roller 40 and if a weight is put into the scale pan 13 the pendulum will swing to the left to a point where it balances the load.

When the scale has come to rest, handle 23 is pulled forward, and ratchet 22 and arm 25 will follow, because of springs 32 and 30. Before arm 25 comes into contact with 26 and therefore before any motion of gear sector 21 occurs roller 40 will be moved out of engagement with finger 39 permitting spring 38 to force arc 37 into contact with pendulum 18, thus holding the pendulum from any further motion. As soon as arm 25 engages stop 26, gear sector 21 will move forward with handle 23 and printing ratchet 22, turning pinion 28 and the computing mechanism to which it is attached. The handle 23, ratchet 22 and gear sector 21 will continue to move as one piece until projection 24 comes into contact with pendulum 18 now held immovably by arc 37. The motion of gear sector 21, pinion 28 and the computing mechanism will now cease and a further motion of handle 23 will extend the spring 32 until the handle engages stop 35, printing ratchet 22 remaining stationary because of the greater strength of spring 30 over that of spring 32.

This relative motion of the handle 23 and ratchet 22 will bring the teeth of rim 29 and arc 31 into alinement, permitting hook 45 to drop into engagement with the teeth, which was previously impossible because of their non-alinement.

A further and final movement of handle 23 will move the handle and ratchet 22 as a unit extending spring 30 and pull hook 45 forward and through shaft 42 and connected linkage force the card down to receive the impression of the recording device. There can be no further forward movement of handle 23 when this is accomplished, the cycle of operations being completed, and the handle will now be moved backward to the starting or zero position of the apparatus, where the scale will again be freed from the restraint of arc 37 ready for another weighing.

The computing mechanism for ascertaining and indicating the money value of the article weighed at a definite rate per unit consists of a series of differential gears so connected that each will transmit its motion to the next one and produce therein a motion twice as great as its own, in combination with means for selecting one or more of the series to move during a given computation while the remainder remains stationary, the choice depending on the unit-rate to be used. The motion of the last gear of the series is transmitted to a counter of any of the usual types in the market and having raised figures suitable for printing.

In Figs. 3 and 4, 100 is a box-like base by which the various parts of the computing mechanism are supported and which in turn is supported by two posts 52 and 53 attached to base 11. A shaft 101 is journaled in posts 102 and 103 and pinion 28 which meshes with gear sector 21 is secured to this shaft. Rotatably mounted on shaft 101 are four gears, $1^a$, $2^a$, $4^a$ and $8^a$. On each side of gear $1^a$ is a jaw-clutch member $1^b$ and $1^c$. On the left hand side of gear $1^a$ is a non-rotatable jaw-clutch member $1^d$, matching $1^b$ and mounted on clutch shifter $1^f$. On the right side of gear $1^a$, a jaw clutch member $1^e$ matching $1^c$ is slidably mounted on shaft 101 and is keyed to it so as always to rotate with it. A shifter fork $1^g$ mounted on clutch shifter $1^f$ engages a groove in clutch member $1^e$. Clutch members $2^b$, $2^c$, $2^d$ and $2^e$, a clutch shifter $2^f$ and a shifter fork $2^g$, similar to the same parts used in connection with gear $1^a$, are provided for use with gear $2^a$ and similar parts for gears $4^a$ and $8^a$.

Upon a shaft 104 is journaled in posts 105 and 106 are mounted four differential gears 1, 2, 4 and 8, each consisting of two gears, such as $2^h$ and $2^i$, and two pinions, as $2^j$ and $2^k$ rotatably mounted on a hub $2^m$. The hub $2^m$ has a sleeve $2^n$, extending to the right, and the left hand gear $4^h$ of the next differential is firmly secured thereto as by key $2^o$. The right hand gear $2^i$ of differential 2 rotates freely on sleeve $2^n$ and there is attached to it a gear $2^p$ which meshes with gear $2^a$ on shaft 101. Differentials 1, 4 and 8 are made in a similar manner to differential 2, which has been described and all parts of these differentials turn freely on shaft 10, except the last gear of the series, the left hand gear of differential 1, which is securely pinned to the shaft. The hub $8^m$ of differential 8 is prevented from rotating by a link 107 attached to the base 100. A counting device 108, supported by bracket 119, is attached to shaft 104 so that the units wheel revolves with the shaft and the revolutions of this unit wheel are carried to tens and hundreds wheels in the usual manner of such devices, the Veeder counter being an illustration of a suitable mechanism.

Secured to shafts $1^q$, $2^q$, etc., to which clutch shifters 1 are secured are arms, $1^r$, $2^r$, etc., and two rods $1^s$, $1^s$ etc., extend between each shifter and arm. The shifters, arms and rods are pressed to the left by springs $1^t$, $2^t$, etc. A set of unit-rate selector bars $A^1$, $A^2$, $A^3$ to $A^{15}$ are slidably mounted in frame 100 and in the construction illustrated are arranged in two banks. Selector bars $A^1$, $A^2$, etc., to $A^8$ are arranged in the upper bank, and selector bars $A^9$, $A^{10}$, etc., to $A^{15}$ are arranged in the lower bank. In Fig. 3 selector bar $A^2$ has been removed in order to show selector bar $A^{10}$ in the lower bank, while in Fig. 4 all the selector bars of the upper bank except $A^8$ and all the selector bars of the lower bank except $A^{10}$ have been removed for clearness of illustration. They are each provided with teeth, such as $A^{81}$, $A^{82}$, $A^{84}$, $A^{101}$, $A^{104}$ located in operative relation to the rods, $1^s$, $2^s$, etc. Each selector bar is pressed outwardly by coil spring, as $A^{15}$, $A^{85}$, $A^{105}$ against a stop, $A^{87}$, $A^{107}$, when not in use and is held in operative position by a pawl 109 catching tooth $A^{86}$, $A^{106}$, on the bar.

If we assume that clutch shifters $2^f$, $4^f$ and $8^f$ are pushed to the right, gears $2^a$, $4^a$ and $8^a$ will be engaged by the clutch members $2^d$, $4^d$ and $8^d$ and will be held stationary, while clutch member $1^e$ will engage gear $1^a$. If shaft 101 is now turned in the direction of the arrows sufficiently to produce one rotation of gear $1^p$ this will produce, through gear $1^i$, and pinions $1^j$ and $1^k$, one rotation of gear $1^h$ in the direction of the arrows, since hub $1^m$ will be held immovable by the locking of gears $2^a$, $4^a$ and $8^a$. Since gear $1^h$ is pinned to shaft 104, the units wheel of the counter 108 which is likewise secured to shaft 104 will therefore make one revolution and record ten units for each rotation of gear $1^h$. Therefore it will record ten units for each rotation of gear $1^p$.

If we assume that clutch shifters $1^f$, $4^f$ and $8^f$ are pushed to the right, gears $1^a$, $4^a$ and $8^a$ will be engaged by the clutch members $1^d$, $4^d$ and $8^d$ and will be held stationary, while clutch member $2^e$ will engage gear $2^a$ and cause it to turn with shaft 101. If shaft 101 is now turned in the direction of the arrows sufficiently to produce one revolution of gear $2^p$ and bevel gear $2^i$ in the opposite direction, one rotation of gear $2^h$ in the direction of the arrows will be effected, since hub $2^m$ is held immovable by the locking of gears $4^a$ and $8^a$. Since gear $2^h$ is secured to hub $1^m$, the latter will also make a complete rotation, and since gear $1^i$ is held stationary by the locking of gear $1^a$, two revolutions of gear $1^h$, shaft 104 and the units wheel of the counter 108 will be produced. In other words, one revolution of gear $2^p$ will record 20 units on the counter.

If we assume that clutch shifters $1^f$, $2^f$ and $8^f$ are pushed to the right, gears $1^a$, $2^a$ and $8^a$ will be engaged by clutch members $1^d$, $2^d$ and $8^d$ and held stationary, while clutch member $4^e$ will engage gear $4^a$ and cause it to turn with shaft 101. If shaft 101 is now turned in the direction of the arrows sufficiently to produce one rotation of gear $4^p$ and bevel gear $4^i$ in the opposite direction, one revolution of gear $4^h$ in the direction of the arrow will be effected since hub $4^m$ is held immovable by the locking of gear $8^a$. Hub $2^m$ being secured to gear $4^h$ will also make a complete rotation and, since gear $2^i$ is held stationary by the locking of gear $2^a$, two revolutions of gear $2^h$ and attached hub $1^m$ will be produced. Since gear $1^i$ is held stationary by the locking of gear $1^a$, these two revolutions of hub $1^m$ will effect four rotations of gear $1^h$, shaft 104 and the units wheel of the counter 108.

If clutch shifters $1^f$, $2^f$ and $4^f$ are pushed to the right gears $1^a$, $2^a$ and $4^a$ will be engaged by clutch members $1^d$, $2^d$ and $4^d$ and will be held stationary, while clutch member $8^e$ will engage gear $8^a$ and cause it to turn with shaft 101. If shaft 101 is now turned in the direction of the arrows sufficiently to produce one rotation of gear $8^p$ and bevel gear $8^i$ in the opposite direction, one revolution of gear $8^h$ in the direction of the arrows will be effected since hub $8^m$ is held immovable by link 107. Hub $4^m$, being secured to gear $8^h$ will also make a complete rotation and since gear $4^i$ is held stationary by the locking of gear $4^a$, two revolutions of gear $4^h$ and attached hub $2^m$ will be produced. Since gear $2^i$ is held stationary by the locking of gear $2^a$, these two revolutions of hub $2^m$ will effect four rotations of gear $2^h$ and attached hub $1^m$. Since gear $1^i$ is held stationary by the locking of gear $1^a$, these four revolutions of hub $1^m$ will cause eight rotations of gear $1^h$, shaft 104 and the units wheel of the counter 108. Therefore one revolution of gear $8^p$ will record 80 units upon the counter 108.

If we assume that clutch shifts $4^f$ and $8^f$ are pushed to the right, gears $4^a$ and $8^a$ will be engaged by clutch members $4^d$ and $8^d$ and will be held stationary, while clutch members $1^e$ and $2^e$ will engage respectively gears $1^a$ and $2^a$. If shaft 101 is now turned in the direction of the arrows sufficiently to produce one rotation of gears $1^p$ and $2^p$ there will be produced one rotation of gear $1^i$ in a direction opposite to the arrows, which will produce through pinions $1^j$ and $1^k$ one rotation of gear $1^h$ in the direction of the arrow, as previously pointed out. At the same time one rotation of gear $2^p$ in a direction opposite to the arrows will be produced; one revolution of gear $2^p$ and attached gear $2^i$ will be produced, which will cause through idler gears $2^j$ and $2^k$ one revolution of gear $2^h$ and attached hub $1^m$ in the direction of the arrows. Since hub $2^m$ is held immovable by the locking of gears $4^a$ and $8^a$, this will produce, as previously pointed out, two revolutions of gear $1^h$ in addition to the one revolution of gear $1^h$ caused by the rotation of gears $1^h$ and $1^i$, described above. In other words, gear $1^h$ will have a composite motion comprising the sum of the combined motions caused by the rotation of gears $1^p$ and $2^p$, or three rotations in all. Similarly, if any two, three or four of the gears $1^a$, $2^a$, $4^a$ and $8^a$ are engaged at the same time by their respective jaw-clutch members $1^e$, $2^e$, $4^e$ or $8^e$ and therefore turn the shaft 101, each will produce upon the gear $1^h$, shaft 104 and counter 108 the same effect as if the other gears were stationary, with the result that the record on the counter will be the sum of the records which would be caused by independent movements of the gears.

The ratio of the gearing of the mechanism is such that the motion of gear sector 21 corresponding to a weight of one pound in the scale pan will cause a motion of one-tenth of a rotation in gears $1^p$, $2^p$, $4^p$ and $8^p$ when connected. Therefore by a suitable selection of these gears. any integer up to 15 may be recorded on the counter, by a motion of the gear sector 21 corresponding to a weight of one pound. If the selected integer or rate-unit is 10, gears $2^a$ and $8^a$ will be operatively connected to shaft 101 as is shown in the drawings. If the rate unit is 11, gears $1^a$, $2^a$ and $8^a$ will be connected; if the rate unit is 15, gears $1^a$, $2^a$, $4^a$ and $8^a$ will all be connected. Since the rotation of the gears $1^p$, $2^p$, $4^p$ and $8^p$ is in exact proportion to the movement of gear sector 21, and therefore in proportion to the weight upon the scale, the record exhibited by the counter at the end of the computing operation will be the true product of the weight upon the scale multiplied by the selected unit-rate.

There are as many unit-rate selector bars as there are unit rates in the range of the mechanism and the teeth on each are appropriate in number and location to select for operation those gears whose record upon the counter will total the corresponding rate. In the form of my device shown in the drawings the selector bar teeth throw the stationary jaw-clutch members into engagement with those gears which it is not desired to operate, the springs retaining the remaining gears in operative connection with the shaft 101. The pawl 109 is so constructed that pushing in any selector bar releases the selector bar which was used for the previous computation, so that only one bar will be in operative position at one time.

In order to totalize the results of a series of computations, a gear 111 and ratchet wheel 112 secured together, are rotatably mounted on shaft 104. An arm 113 is secured to shaft 104 and carries a pawl 114 arranged to engage the teeth of ratchet 112 and drive it, during the forward motion of shaft 104. A gear 115 and ratchet 116 are located on the shaft of a counter 117, supported by a bracket 120, and gears 111 and 115, which are equal in size, mesh together. A pawl 118 pivoted to the frame of the mechanism engages the teeth of ratchet 116 and prevents any backward motion of counter 117. The units wheel of counter 117 will therefore duplicate the forward movements of the units wheel of counter 108. Since the pawl 118 prevents backward motion of counter 117, all its forward movements will be added together, thus totalizing the successive computations.

The largest rate-unit for which the illustrated mechanism is adapted is 15, since to use this rate-unit all four gears $1^a$, $2^a$, $4^a$, and $8^a$ will be connected for rotation with shaft 101. However, other differentials may be added to the series, if similar in construction and in connection to the differentials shown, and will produce for one revolution of their appropriate gears respectively 16, 32, 64, etc. revolutions of shaft 104, thus extending the possible rate-units to 31, 63, 127, etc. respectively.

If it is desired to compute at rates including a half unit, as, for instance, at $7\frac{1}{2}$, a differential may be placed at the left of differential 1 and arranged to produce a half revolution of gear $1^h$ for each complete rotation of the appropriate gear of this differential. In order not to unduly increase the number of rate-unit selector bars, it will be desirable to have a special half-unit selector bar to be used with the selector bars representing integers when a rate including a half unit is to be used.

For the purpose of retaining the card or other recording surface upon which it is desired to impress the record of counter 108, a card holder 121 is attached to bell crank lever 49 and is provided with retaining clips 122 which will securely hold the edges of the card 123 when it is bent to conform to the outline of the card holder 121. If a direct reading counter, such as is illustrated, is used, the card will be backed by a carbon surface 124 and a record will be made on the upper surface of the card by the impression of the figures of the counter, but if the figures are reversed, as is usual in the printing art, the record will be impressed or otherwise marked on the lower surface of the card by contact with the figures.

While the form of mechanism here shown and described is well adapted to fulfil the objects primarily stated, it is to be understood that it is not intended to confine the invention to the one form of embodiment here disclosed for it is susceptible of being embodied in several forms, all coming within the scope of the claims which follow.

I claim and desire to secure by Letters Patent—

1. In a registering and computing scale, in combination, weighing mechanism, computing mechanism comprising a series of differential gear units so connected as to transmit motion from unit to unit in geometrical ratio, and means for selectively moving one or more of said gear units proportionally to the movement of said weighing mechanism.

2. In a registering and computing weighing scale, in combination, weighing mechanism, transmission mechanism including a series of differential gear units arranged to transmit movement in geometrical ratio, means for selectively transmitting movement proportional to the movement of said weighing mechanism to said units, and registering mechanism connected to said transmission mechanism.

3. In a registering and computing weighing scale, the combination of a weighing scale, means for locking said scale after the weighing operation is completed, computing mechanism including rotatable members, means for selecting some of said rotatable members for operative motion, means for holding the remaining rotatable members immovable, a series of differential gear units, operatively connected respectively with said rotatable members and adapted to produce a motion of a selected gear of the series varying in a geometrical ratio according to which rotatable member is selected for operative motion, and mechanism adapted to register the amount of the motion of said selected gear.

4. In a registering and computing weighing scale, the combination of a scale shaft, means for imparting motion to the shaft controlled as to extent by the motion of said scale in reaching a balance, rotatable members mounted on said shaft, means for either holding said members stationary or securing them to the shaft for rotation therewith, differential gear units, operatively connected with said rotatable members and connected with one another in series so as to produce motion of a selected gear in the series varying in a geometrical ratio according to which rotatable member is secured to said shaft, and mechanism adapted to register the extent of motion of said selected gear.

5. In a registering and computing weighing scale, the combination of weighing mechanism, computing mechanism comprising rotatable members and a series of differential gear units operatively connected with said rotatable members and adapted to produce a motion of a selected gear of the series varying in a geometrical ratio according to which differential is selected for operative motion and registering mechanism connected to said selected gear and simultaneously operated therewith.

6. In a registering and computing scale, in combination, weighing mechanism, computing mechanism comprising a multiplying series of differential gear units, a rotatable member connected to each gear unit, means for selectively holding each of said rotatable members against movement or moving it proportionally to the movement of said weighing mechanism, and registering mechanism connected to said computing mechanism.

7. In a computing scale, registering mechanism, computing mechanism including a series of differential gear units each comprising a driving gear, a driven gear, idler pinions meshing with both said gears, a central hub carrying the idler pinions and attached to the driven gear of the gear unit next higher in the series, and means for connecting the last driven gear of the series with the registering mechanism.

8. In a computing scale, registering mechanism, computing mechanism including a series of differential gear units each including a driving gear, an epicyclic gear and a driven gear arranged adjacent the registering mechanism and so connected with each other and with the registering mechanism as to rotate the registering mechanism to an extent equal to the sum of the amount of rotation of the several epicyclic gears to which motion imparted multiplied by that power of two representing the position in the series of the particular gear unit of which the epicyclic gear in question is a part.

9. In a computing scale, registering mechanism, computing mechanism including a series of interconnected differential gear units, a shaft connected to the last gear unit, the connection between the several gear units being such as to rotate the shaft at a geometrically progressive rate according to the gear unit of the series to which motion is first applied.

10. In a computing scale, registering mechanism, computing mechanism including a series of interconnected differential gear units, each of which comprises a driving gear, an epicyclic gear and a driven gear, an instrumentality connecting the driven gear of the last gear unit with the registering mechanism, and means for imparting motion to one or more of said gear units, the connection of the several gear units being such as to rotate the driven gear of the last gear unit to an extent equal to the sum of the amount of rotation of the several epicyclic gears to which motion is imparted multiplied by that power of two representing the position in the series of the particular gear units of which the epicyclic gears in question are parts.

11. In a computing scale, computing mechanism including a series of differential gear units having driven gears and epicyclic gears rotating upon hubs the hubs of the successive units being attached respectively to the driven gears of the preceding gear units, a shaft connected with the driven gear of the last gear unit, means for locking certain of said hubs against rotation, means for imparting motion to the remaining hubs, whereby a progressively increasing rate of rotation may be imparted to the shaft from the driven gears then rotated.

In testimony whereof I have signed my name to this specification in the presence of two subscribing witnesses.

EDWARD G. THOMAS.

Witnesses:
  MABEL O. THOMAS,
  HELENE ODIOME.